Dec. 23, 1941.  J. B. TEGARTY  2,266,831
METHOD AND APPARATUS FOR IMPROVING MOLDED THERMOPLASTIC ARTICLES
Filed May 10, 1937  3 Sheets-Sheet 1

INVENTOR.
JOHN B. TEGARTY
BY
ATTORNEY.

Dec. 23, 1941.     J. B. TEGARTY     2,266,831
METHOD AND APPARATUS FOR IMPROVING MOLDED THERMOPLASTIC ARTICLES
Filed May 10, 1937     3 Sheets-Sheet 2

INVENTOR.
JOHN B. TEGARTY
BY
ATTORNEY.

INVENTOR.
JOHN B. TEGARTY
BY
ATTORNEY.

Patented Dec. 23, 1941

2,266,831

UNITED STATES PATENT OFFICE 2,266,831

METHOD AND APPARATUS FOR IMPROVING MOLDED THERMOPLASTIC ARTICLES

John B. Tegarty, St. Clair, Mich., assignor, by mesne assignments, to The Standard Products Company, Port Clinton, Ohio, a corporation of Ohio Application May 10, 1937, Serial No. 141,663

6 Claims. (Cl. 18—36)

This invention relates to an improved injection type mold for producing articles of thermoplastic or analogous material and is directed more specifically to the construction of such a mold affording exfiltration of gases from the mold cavity during injection of the plastic material and at the same time preventing the escape of material from the cavity.

For the purpose of convenience in illustration, this invention will be described in connection with the molding of thermoplastic materials, it being understood that the mold is equally useful in connection with the molding of other materials.

Prior to this invention, thermoplastic articles such as hardware, automobile steering wheels, and the like which were covered or molded by the injection process, were found to contain flaws in the surface of the coating. These flaws were in the form of minute wrinkles in the surface and in some instances burned or charred areas. It was discovered that these flaws were produced by small pockets of air or gas entrapped in the mold cavity between the approaching streams of thermoplastic material or in "dead end" portions of the mold cavity. In such prior molds there was no means of escape for this trapped gas from the cavity and accordingly the cavity could not be completely filled with the material. As a result these molds produced irregular lines on the thermoplastic surface, or gas bubbles just beneath the surface of the coating. Also this trapped gas, when highly compressed by the material in the mold during the injection and holding pressures, became sufficiently heated to cause ignition and detonation of the entrapped gases, which resulted in a burned, charred, or bare spot at the zone where the gas was trapped and detonated.

The principal objects of the present invention, therefore, are to provide a mold and a method of making a mold member for molding articles of thermoplastic material by injection by which entrapment of gases and damage to the molded material by the gases is eliminated.

Another object is to provide for exfiltration of the gases in a mold cavity having metal walls during the injecting operation so as to prevent the formation of such gas pockets and eliminate the resultant damage to the thermoplastic coating, thus greatly improving the appearance of the surface and decreasing the number of rejected products.

Another object is to provide an exit permitting efficient exfiltration of the entire quantity of gas while at the same time strictly confining and retaining the entire quantity of thermoplastic material within the mold cavity.

Another object is to provide an exit for the gas within a metal mold cavity at predetermined zones where the streams of thermoplastic material converge and unite.

A further object is to provide a metal mold for molding plastic materials, certain wall portions of the mold assuring complete displacement of the gases in the cavity by the plastic material.

A still further object is to provide an improved method of molding articles of plastic material which comprises injecting the material into a closed metal mold cavity under pressure sufficient to cause self ignition or detonation of any entrapped gases contained in the material, constraining the material within the cavity while concurrently effecting exfiltration of the gases through the metal walls of the cavity walls to prevent such entrapment and the resulting detonation.

A more specific object is to provide a mold formed of a plurality of metal parts so closely fitted that the material cannot pass therebetween though the gases displaced by the material may escape therebetween.

Other objects and advantages will become apparent from a consideration of the following description and accompanying drawings, in which.

Figure 1:
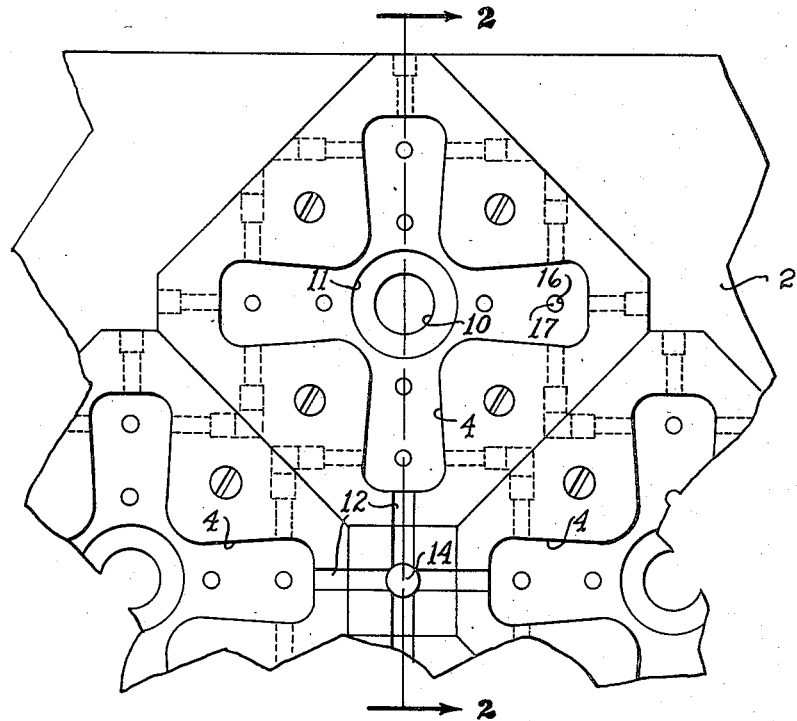
Fig. 1 is a fragmentary plan view of a mold for producing water faucet handles and embodying one form of the present invention.
Figure 2:
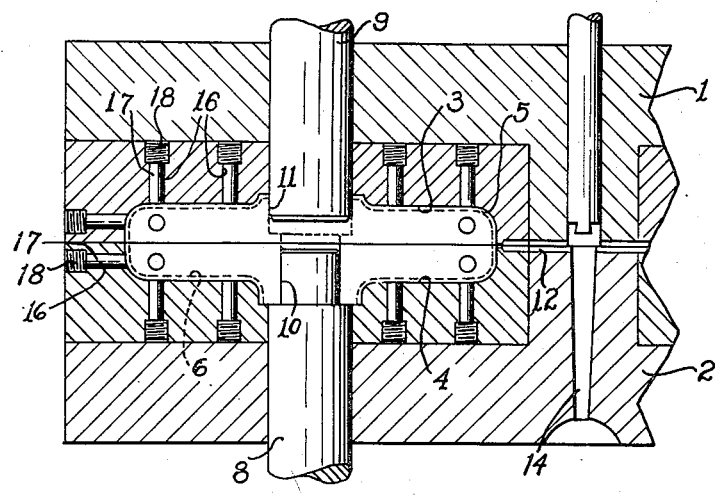
Fig. 2 is a fragmentary sectional view taken substantially along a plane indicated by the line 2—2 in Fig. 1.

Referring to the drawings, and particularly to Figs. 1 and 2, the mold herein shown is designed for the purpose of producing a coating of thermoplastic material on a water faucet handle. The mold comprises upper and lower, separable mold sections 1 and 2, respectively. These sections are provided with recesses 3 and 4, respectively, which together define a mold cavity 5.

Positioned centrally within the mold cavity 5 is a core 6 which is indicated by dotted lines in Fig. 2. This core is held in central position with respect to the cavity by means of suitable ejecting and centering pins 8 and 9 having portions which engage hub passages 10 and 11, respectively, in the core 6.

Leading to the cavity 5 is a gate 12 which conducts plastic material from a sprue passage 14 into the mold cavity. The material, in the plastic state, is forced from a suitable pressure source through the sprue passage 14 along the gate 12 and into the cavity 5.

Upon entering the cavity the material strikes the core 6 and divides into a number of divergent streams. These streams flow between the walls of the recesses 3 and 4 and the core 6 and finally converge in a remote portion of the mold cavity from the point of entrance.

Prior to the admission of thermoplastic material into the cavity the said cavity is filled with air which must be displaced by the injected material. Thus the gas must be entirely removed from the cavity by the incoming or injected thermoplastic material.

In prior molds the major portion of the gas is expelled between the parting surfaces of the mold sections. In such molds, however, minute pockets of gas often times become trapped in the cavity between the cavity walls and the material, either above or below the parting surfaces of the sections, and no possible means of escape for the gas during the continued injection of the material under high pressure is provided. As stated before, this trapped gas sometimes directly prevents the complete filling of the mold cavity with thermoplastic material and accordingly results in irregular surface flaws in the form of grooves, pits or charred areas. At other times, the entrapped gas becomes so compressed by the high injection and molding pressure on the material that spontaneous combustion, with a positive detonation, of the gas results and either pits the surface of the material or burns and discolors the material.

Also in prior molds for molding thermoplastic or other materials, it is common practice to provide knock-out pins for engaging the molded material for ejecting the molded material from the mold cavity. Such knock-out pins are fitted as closely as possible while affording proper operation without danger of sticking. In the use of such molds, it has been noticed that the detonations of entrapped gas never occur at the zone of the knock-out pins regardless of the high injection pressure but often occur at points remote from these pins and from the point of injection. Experience has indicated that the close-fit knock-out pins, while sufficient to prevent the escape of material between the pins and their guiding surfaces, afford a sufficient passage for the exfiltration of gases under the pressures employed in such molding at or adjacent the zone of the knock-out pins.

Further, it is found that except for the slight mark resulting from the impact of the pin upon ejection of the article, no appreciable marking is noticeable on the surface of the article at the zone of the knock-out pin. These pins, however, are usually located at positions considerably removed from portions of the cavity where entrapment of the gases most generally occurs. From these facts, it appears that corresponding pins can be put at the zone where the gases are usually entrapped, these pins being fitted with the same or slightly less clearance than knock-out pins, but being secured in stationary position with respect to the mold cavity, and preferably installed before finishing the cavity wall so that no noticeable difference in the surface of the cavity wall results where the ends of the stationary pins are exposed. Other means which act in the same manner are also a possible solution of the problem of gas entrapment. For permitting the exfiltration of gas in a corresponding manner, the structures such as illustrated herein are provided and as a result the surface flaws caused by entrapped gases are eliminated.

One means by which this trapped gas is allowed to escape is by providing a plurality of openings 16 leading to the mold cavity 5. These openings are in the recesses 3 and 4 as shown in Fig. 2. A tight fitting plug 17 is inserted in each of the openings 16 and may be securely held therein through the medium of screw threads 18 on one end of the plug engaging cooperating threads in the associated mold section. The end of the plug 17 is highly finished and flush with the remaining portion of the cavity wall 5 so as to form smooth, continuous, and uninterrupted cavity walls.

Although each plug 17 is tightly fitted into the associated opening 16 there is preferably provided a minute passage or space therebetween, the passage merely being sufficient to allow the escape of any trapped gas within the cavity and still prevent the escape of material through the passage while being injected into the cavity under high pressure.

It has been found by commercial practice that the thermoplastic material will escape through a passage or slot slightly greater than one one-thousandth of an inch in thickness but that any passage of less dimension than one one-thousandths of an inch is ample to allow the gas to escape but will confine the material within the cavity. Thus, the space between the surface of each plug 17 and the wall of the associated opening 16 must necessarily be limited to one one-thousandth of an inch or less in order to effect the desired result.

Since the ends of the plugs 17 are formed concurrently with the remaining portion of the cavity there is no appreciable surface interruption in the mold cavity at these plugs. The entire surface of the molded article is smooth and finished and consequently requires no subsequent finishing operation except the slight ridge formed at the parting surface of the mold sections.

It will be noted that a plurality of such plugs 17 and openings 16 are distributed over the entire area of the cavity wall so that this gas, which would ordinarily be trapped within the mold cavity, will find an exit to the atmosphere wherever the gas pocket happens to form. This gas is admitted into the atmosphere by escaping past the comparatively loose fitting threads 18.

It is appreciated that ordinary sand molds allow exfiltration of gases from the cavity to prevent explosion of the mold when the molten metal is being poured. These sand molds, however, do not provide a smooth finished surface to the article because of the granular structure of the sand cavity walls. Thus in order to produce this highly finished surface a hardened metallic cavity wall must be provided which will also withstand the high injection pressures used. The gases in the cavity filter through the metal cavity walls between the plugs 17 and the openings 16 and the material is constrained within the cavity. The smooth finish on the cavity walls provides a correspondingly smooth finish on the molded article.

Figure 3:
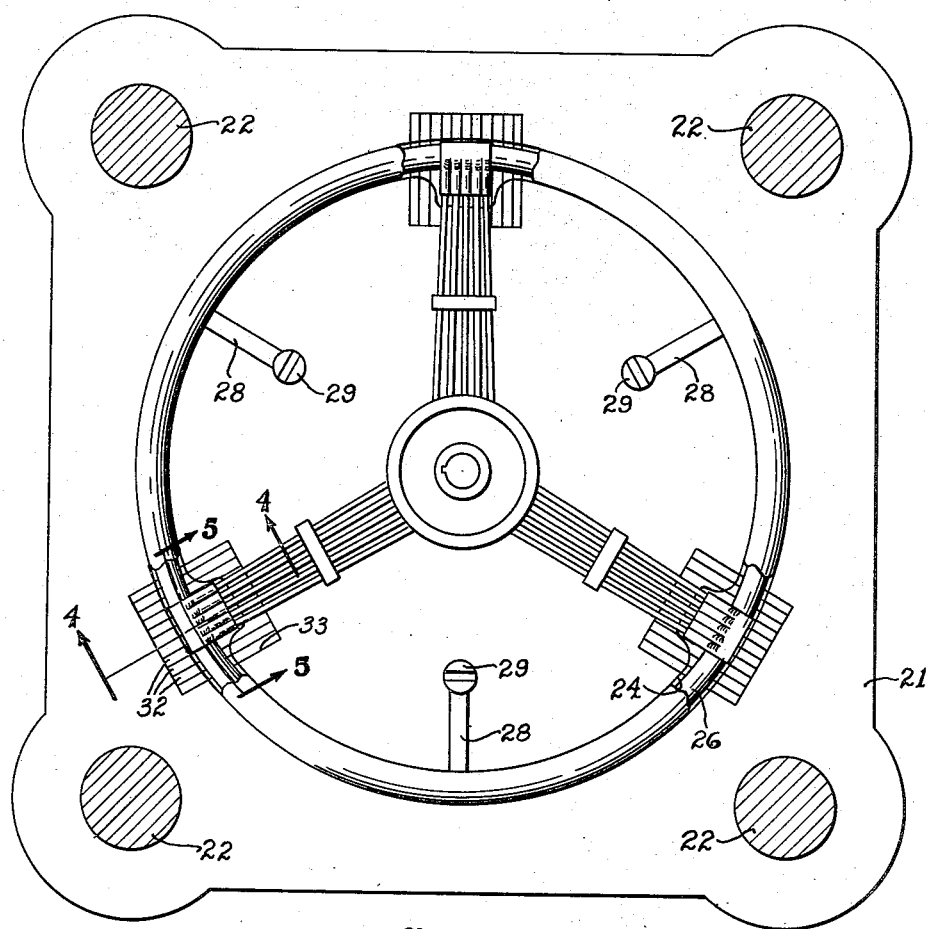
Fig. 3 is a plan view of one section of a mold for forming a coating of thermoplastic material on a steering wheel spider.
Figures 4, 5:
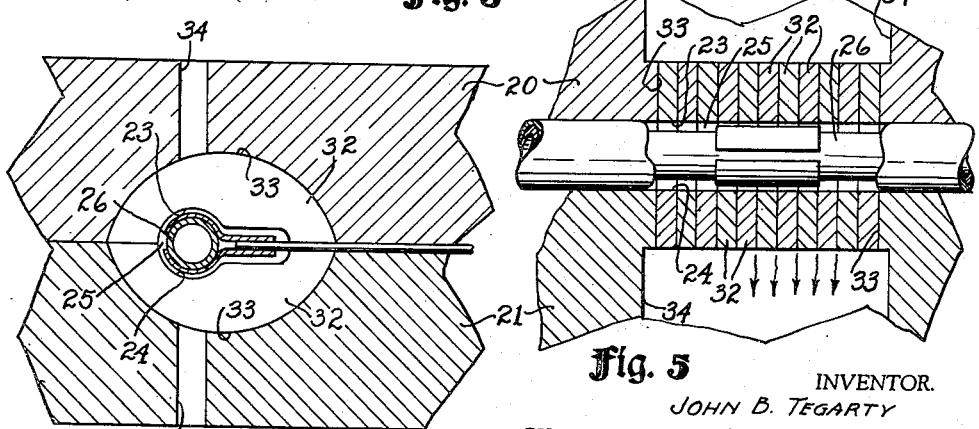
Fig. 4 is an enlarged fragmentary sectional view through the gas exits and is taken along the line 4—4 in Fig. 3.
Fig. 5 is an enlarged fragmentary sectional view through the mold cavity taken along the line 5—5 in Fig. 3.

Referring now to Figs. 3 to 5, inclusive, a mold for applying a coating of thermoplastic material to a steering wheel spider is shown comprising upper and lower mold sections 20 and 21, respectively, which are capable of being moved toward and away from each other on suitable guides 22. An annular recess 23 and 24 is provided in the mold sections 20 and 21, respectively. When the sections 20 and 21 are brought into abutting engagement with each other these recesses 23 and 24 define a closed annular cavity 25. Positioned centrally within the cavity 25 and held in spaced relation from the walls thereof is a suitable steering wheel rim spider or core 26 which is to be coated with thermoplastic material.

Leading to the cavity 25 are a plurality of gates 28 which admit material in a plastic state under pressure from a suitable sprue passage 29 to the mold cavity 25.

When the rim core 26 is properly positioned within the cavity 25 an air space is formed between the walls of the rim 26 and the wall of the cavity 25. As the material is injected into the cavity through the gates 28 it divides, as previously described, into diverging streams, each proceeding longitudinally and circumferentially of the rim and displacing the air between the rim 26 and the cavity wall 25.

In the present instance the material is thus concurrently injected into the cavity from the plurality of gates 28, as shown in Fig. 3. Thus one stream of plastic material issuing from a given gate approaches another stream issuing from the circumferentially neighboring gate and the said streams meet in a predetermined zone circumferentially of the rim from the gates 28.

The leading edges of the two approaching streams of thermoplastic material displace the gas within the cavity and tend to compress the gas as the cavity becomes more completely filled with material. At the zone where these streams meet and unite with each other, exits for the gas are provided which prevent entrapment of small pockets of gas either above or below the parting surface of the mold sections.

These exits are provided between adjacent surfaces of a plurality of laminations 32 which are placed substantially radially of the rim 26 and are inlaid into the mold sections 20 and 21 in edgewise relation to the cavity 25. These laminations may be inlaid by milling recesses 33 in the surface of each of the mold sections and placing each lamination 32 in position within its associated recess, as shown in Fig. 4.

The cavity 25 is made continuous and without interruption along this portion by cutting notches in the edges of each of the laminations 32 which conform to the shape of the cavity and while the laminations are positioned within the recesses 33. Thus the notches are flush, smooth and highly finished like the remaining portion of the cavity so that there is no break in the cavity surface across each group of laminations. These laminations are preferably made of hardened steel which are accurately ground to the desired dimensions so that in placing each entire group of laminations in the associated milled recess 33 each lamination 32 may be tightly held in place by frictional engagement with the side walls of the recess. It may be found desirable, however, to spot weld each group of laminations together as a unit and place the unit in the recess. Thus the zone where the streams of material meet and unite is provided with a number of exits for the gas between adjacent laminations 32. Even though the laminations are tightly compressed together within the recess there inherently remains a sufficient passage or exit for the gas which would otherwise be trapped in the mold cavity without allowing the plastic material in the cavity to escape through the exits.

In order to allow the gas to escape into the atmosphere after it has exfiltrated from the cavity each of the mold sections 20 and 21 may be provided with a slot 34 which connects with the recess 33 and the laminations 32. This exfiltration is indicated by arrows in Fig. 5. This slot 34 also provides a means for removing the laminations 32 when such removal is found desirable. Thus by placing a tool in the slot 34 and against the edges of the laminations 32 and by tapping the tool with a hammer the laminations may easily and conveniently be removed from within their associated recesses.

It may be found desirable to provide other means than friction for holding the laminations within the recesses but such provision is beyond the scope of the present invention and need not be further discussed.

Figure 6:
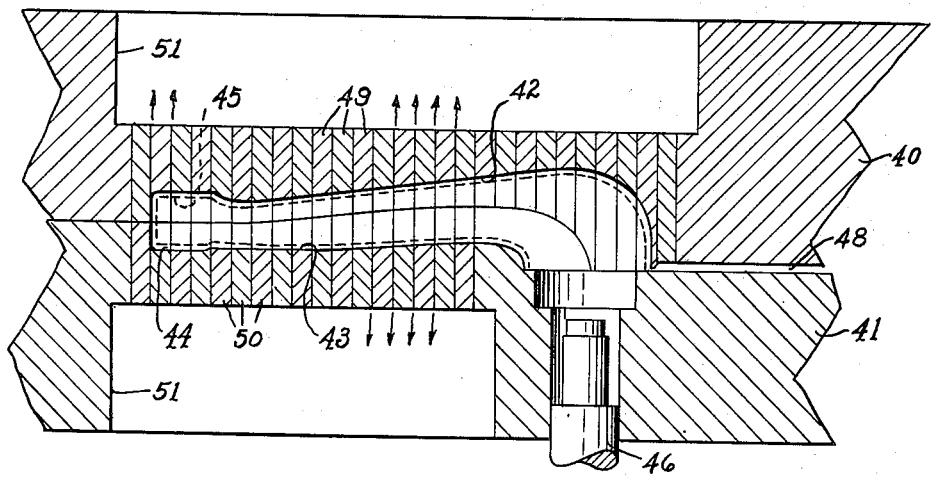
Fig. 6 is a fragmentary sectional view through a mold for forming a piece of hardware such as a window operating handle for automobile doors, disclosing the means for expelling the gas from the cavity.

Referring next to Fig. 6, a mold for forming an automobile window operating handle is shown comprising an upper mold section 40 and a lower mold section 41, the section 40 having a recess 42 and the section 41 having a recess 43. These recesses together define a cavity 44. In the cavity is placed a suitable core 45, indicated by dotted lines, which is held in uniformly spaced relation from the walls of the cavity 44 by means of a centering or ejecting pin 46 in one section of the mold and passing into the mold cavity.

Leading to the cavity 44 is a gate 48 which admits thermoplastic material from a suitable pressure source thereto. The recesses 42 and 43 are formed in the edges of a plurality of laminations or plates 49 and 50, respectively. Any suitable means may be provided for securely holding the laminations to their respective mold sections. Thus, it will be seen that substantially the entire mold cavity 44 is formed in the edges of these laminations so that regardless of where the streams of material flowing in the cavity meet and unite there is absolutely no chance for entrapment of gas between the edges of the streams and the cavity walls. The gas, as in the previously described form, escapes between the adjacent laminations and is dissipated in the atmosphere through knockout slots 51.

Figure 7:
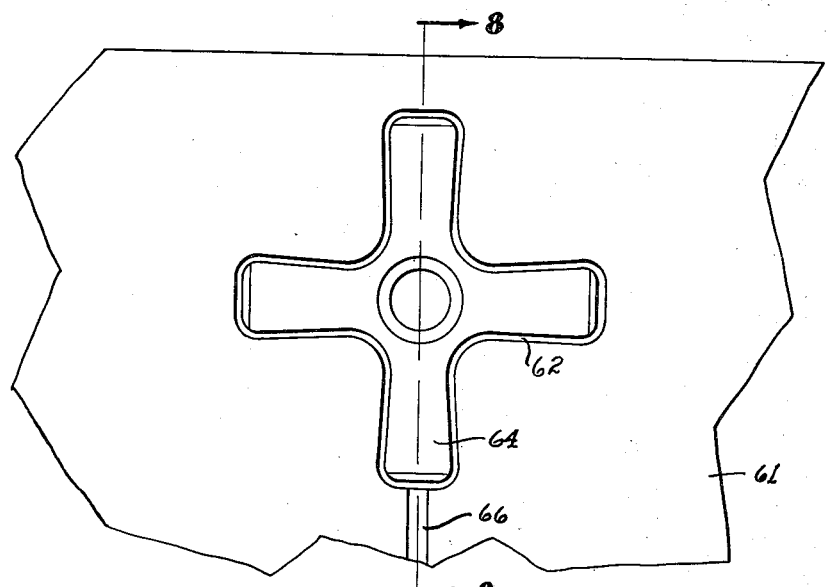
Fig. 7 is a fragmentary plan view of a mold similar to the one illustrated in Fig. 1, the core of the article providing the means of exit for the trapped gas.
Figure 8:
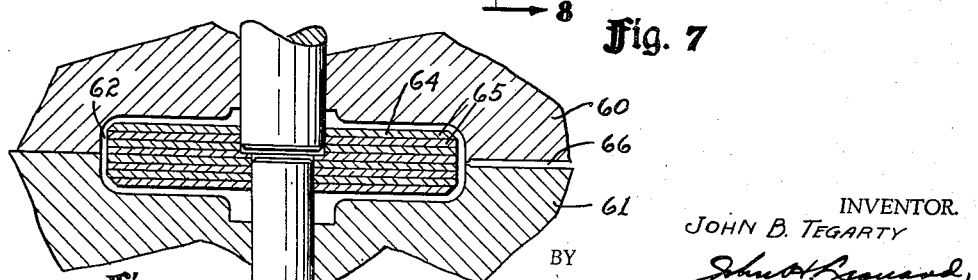
Fig. 8 is a fragmentary sectional view taken substantially along the line 8—8 in Fig. 7.

Referring to Figs. 7 and 8, a mold for forming a water faucet handle similar to the one in Fig. 1 is shown comprising upper and lower mold sections 60 and 61, respectively, having suitable recesses in the abutting surfaces thereof defining the mold cavity 62. A core 64, which is held in spaced relation from the walls of the cavity 62, is built up from a plurality of laminations 65, as shown in Fig. 8. These laminations may be riveted or welded, as desired, to hold them together as a unit prior to the application of the thermoplastic coating thereto. Thus, as the material is injected into the cavity 62 through a gate 66, the gas tending to become entrapped between approaching edges of streams of thermoplastic material flowing in the space between the cavity walls and the core 64 is allowed to escape between the laminations 65 and pass out through the center or hub where the core is supported.

From the above description it will be seen that a novel method and apparatus has been provided which entirely eliminates flaws in the surface of articles of thermoplastic material caused by the entrapment of gas in the mold cavity or in the material itself during the injecting or forming operation. The minute passages provided in the surface of hardened cavity walls allow exfiltration of the gases therethrough and complete displacement of the gases by the material in the cavity. The smooth, hard, highly finished surface of the cavity produces a correspondingly smooth, highly finished surface on the molded article.

The present description has been limited to the provision of gas exits from the mold cavity through passages formed between a cylindrical opening and a close fitting plug and also between closely adjacent laminations. These are merely exemplary embodiments of the invention and may be accomplished in many other ways without departing from the spirit and scope of the present invention.

Having thus described my invention, I claim:

1. A mold for molding articles of plastic material, comprising separable sections which are relatively recessed to provide a cavity at mutually engaging faces, a surface portion of the cavity being formed by a plurality of closely fitting members of gas impervious material with minute gas exits between adjacent members, said exits affording exfiltration of gas from the cavity while confining the plastic material within the cavity.

2. A mold for molding articles of plastic material having a highly finished surface comprising separable metal mold sections with cooperating surface portions which together define a mold cavity, a wall portion of the cavity being formed by a plurality of closely assembled dense metal members, the exposed surfaces of which are flush and polished for providing an accurate and glossy surface on the article, minute gas exits in the surface of the mold cavity between the assembled dense metal members affording exfiltration of gases in the cavity while constraining the material to provide the same smooth surface at the portions of the article overlying the exits as at the portions intermediate the gas exits.

3. A mold for applying a substantially smooth finishing coating of plastic material to the surface of a preformed core, comprising separable mold sections of dense gas impervious material and having surface portions defining a mold cavity, means for holding the said core in spaced relation from the walls of the cavity, said cavity walls including portions assembled from a plurality of closely fitting elements also made of dense gas impervious material, the minute spaces between adjacent elements providing gas exits leading from the cavity for affording exfiltration of air from the cavity while confining all of the material within substantially smooth finished walls of the cavity so that the entire article is substantially smooth, flush and free from gas flaws.

4. The method of making a mold cavity for high pressure injection or compression molding of plastic material, comprising permanently fixing together a plurality of pieces of dense metal stock with complementary faces in mutual close fitting contact, and thereafter forming on said pieces a substantially smooth cavity surface transverse to the general direction of extent of said faces, thereby to provide a cavity wall surface of the desired smoothness which is impervious to passage therethrough of such plastic material under molding pressures but pervious to the passage of gas when such is entrapped in the mold adjacent the regions of close fitting contact between the pieces.

5. A metal mold for molding plastic material comprising smooth, hard, finished and mutually flush gas impervious portions in the mold partially defining a cavity in which the material is to be molded, and other portions defining the balance of said cavity and formed by a plurality of closely fitted elements, individually of dense and gas impervious metal, maintained permanently in fixed relationship to provide gas passages of predetermined size therebetween and sufficient to permit complete displacement of the gases from the cavity by the material being molded in the cavity while preventing escape of plastic material therethrough.

6. An injection type mold for producing articles of plastic material under high pressure, said mold having a cavity in which the material is to be molded, said mold being formed of a plurality of separate rigid parts of gas impervious material terminating flush with each other to form a smooth wall for said cavity, and fitting sufficiently snugly together to constrain the material from entering between the parts at the surface of the cavity wall, but insufficient to prevent passage between the said parts of all of the gases from the cavity when the material in the cavity is subjected to the high injection pressure.

JOHN B. TEGARTY.